United States Patent [19]

Haas et al.

[11] 4,049,835
[45] Sept. 20, 1977

[54] PET FOOD PRESERVATION

[75] Inventors: Gerhard Julius Haas, Woodcliff Lake, N.J.; Edwin Bernard Herman, Yorktown Heights, N.Y.

[73] Assignee: General Foods Corporation, White Plains, N.Y.

[21] Appl. No.: 665,208

[22] Filed: Mar. 9, 1976

[51] Int. Cl.² ............................................. A23B 4/14
[52] U.S. Cl. .................................... 426/106; 426/129; 426/326; 426/805; 426/532; 426/410; 426/656; 426/657
[58] Field of Search ............... 426/129, 410, 324, 312, 426/316, 320, 805, 325, 326, 418, 419, 656, 657, 532, 106

[56] References Cited

U.S. PATENT DOCUMENTS 2,518,100   8/1950   Tomkins .......................... 426/418 X
3,202,514   8/1965   Burgess et al. ..................... 426/74 X
3,851,080   11/1974  Lugg et al. ....................... 426/418 X
3,914,445   10/1975  Pavey ............................. 426/326

Primary Examiner—Joseph M. Golian
Assistant Examiner—R. B. Penland
Attorney, Agent, or Firm—T. J. Carvis; D. J. Donovan; B. P. Struzzi

[57] ABSTRACT

Disclosed is a process for preparing a protein-containing food wherein the use of a carbon dioxide packaging atmosphere is found to unexpectedly increase the effectiveness of polyhydric alcohol, especially propylene and butylene glycol, stability agents employed for antimicrobial purposes. In the preferred embodiment, an intermediate moisture pet food, containing cooked meat and employing propylene glycol at a level less than that otherwise effective against mold or bacterial growth, is packaged in an atmosphere of carbon dioxide to provide a pet food stable against mold and bacterial growth.

10 Claims, No Drawings

PET FOOD PRESERVATION

BACKGROUND OF THE INVENTION

This invention relates to proteinaceous foods and more particularly to animal foods of the shelf-stable, intermediate-moisture variety.

Until the past decade, animal foods were sold either in dry or canned form. The dry variety of the animal foods usually contains less than 10% moisture and hence does not require sterilization procedures or refrigeration in order to render them resistant to microbial decomposition. The dry animal foods, however, are generally characterized by their low degree of palatability, it being found that as a general rule palatability is enhanced at higher moisture contents.

Canned animal foods enjoy a significant degree of palatability owing primarily to their high moisture contents, typically in the area of 75%. However, this high moisture content necessitates the sterilization of such products, generally by retorting, and refrigeration once the can is opened. Thus, canned foods involve significant processing costs and a lack of consumer convenience.

A significant contribution in the animal food field was made by Burgess et al. in U.S. Pat. No. 3,202,514. Therein is described a pasteurized intermediate-moisture animal food based principally upon proteinaceous meaty materials which product is shelf-stable and resistant to micobial decomposition without the need for sterilization, refrigeration or asceptic packaging. The meaty animal food is stabilized by water soluble solutes, principally sugar. The function of these solutes is to bind up available water in which microorganisms grow.

While the product of Burgess et al. represented a significant contribution to the state of the art, the need for improvement in this area has been and continues to be recognized. More specifically, prior art workers have attempted to improve the palatability of such products such that they achieve parity in this area with the more palatable canned animal foods. Palatability improvement may take a variety of forms, such as the overt addition of enhancers, the elimination of negative taste factors, the utilization of greater amounts of meaty materials, and increasing the moisture content.

Among the known negative factors in intermediate animal foods are certain of the stabilizers, especially when employed at relatively high levels. Thus, elimination or reduction in the level of these stabilizers would provide a boost in palatability. Moreover, reduction of the level of stabilizers required would also reduce costs, permitting a net savings or the use of more costly, flavorful ingredients in a product to be sold at the same price. Thus, by reducing the negative factors of the stabilizers, more of the positive factors of the animal food are allowed to exert their effect.

While the aforementioned Burgess et al patent relied mainly upon soluble solids, principle among which is sugar, and employed only relatively low levels of polyhydric alcohols, more recent teachings in the art have suggested the use of levels of polyhydric alcohols such as propylene glycol and butylene glycol in levels of from greater than about 4% to as high as about 20%. It is well recognized that such high levels of the polyhydric alcohols have a negative impact on the palatability of the animal foods, especially for dogs and cats. It would therefore be desirable to in some manner reduce the level of use of these stabilizers but still achieve the same level of stability obtained through the use of high levels of these materials.

It is therefore an object of the present invention to decrease the level of polyhydric alcohols required to stabilize intermediate-moisture food products against microbial growth.

It is a more specific object of the present invention to decrease the level of polyhydric alcohols required to stabilize intermediate-moisture pet food products, especially those comprising pasteurized proteinaceous meaty materials, against microbial growth.

It is another object of the present invention to enable an increase in the levels of the more positive factors, such as meat, water, or nutritional supplements present in the pet food.

This and other objects are accomplished by the present invention which provides an improved process for preparing an intermediate-moisture food product wherein a polyhydric alcohol is employed as an antimicrobial, wherein the improvement comprises:

packaging said food in a substantially gas impervious packing material, and filling the free space in the package with carbon dioxide.

DETAILED DESCRIPTION OF THE INVENTION

Central to the present invention is the discovery of an unexpected co-action between carbon dioxide and polyhydric alcohols such as 1,2-propane diol and 1,3-butane diol. It has been found that by packaging intermediate moisture foods in a carbon dioxide atmosphere, the activity of these and other antimicrobial polyhydric alcohols is unexpectedly enhanced. This improved activity is not due merely to the elimination of oxygen and the employment of an inert gas during packaging because tests indicate that similar treatment with nitrogen gas does not similarly decrease the need for the polyhydric alcohols. By virtue of the present invention, suitable microbial stability can be obtained with low levels of these stabilizers, thus enabling the production of intermediate-moisture foods, especially proteinaceous foods such as pet foods, of improved palatability. The following discussion will relate to the production of proteinacous pet foods as exemplary.

The preservation of moisture-containing foods from microbial decomposition is dependent upon a variety of factors and mechanisms whose interaction is not always fully understood. However, some basic mechanisms are generally well accepted, and can be discussed at this point to aid in understanding the invention.

Microbial growth is largely dependent upon the amount of moisture in a system available as a growth medium. The typical expression of this is the water activity, $A_w$, of a product. The $A_w$ is equal to the vapor pressure of water in the system divided by the vapor pressure of pure water at the same temperature. Theoretically, the $A_w$ of a given system can be lowered to such a degree that the water is not sufficiently available to support any microbial growth. However, to achieve the proper taste and texture for products of the type contemplated by the present invention, it is not possible as a practical matter to obtain these low $A_w$ values. Where the $A_w$ of the system is not lowered to the absolute point below which organisms will not grow, antimicrobials are also added. Typically, these anitmicrobial agents are added to control mold growth which is not sufficiently retarded at the $A_w$ values involved.

Lastly, the provision of an acid medium of sufficiently low pH will aid in preventing microbial decomposition owing to the fact that many organisms cannot survive in such an environment. However, since the requisite pH for achieving this protection is generally so low as to result in an unpalatable, as well as detrimental, system in some cases, the utilization of pH as a primary protective is rarely employed. And, for dog foods especially, it is not desirable to lower the pH substantially below neutral.

The usual preservative mechanisms are generally based on a combination of the above principles and exert a combined stabilizing effect. Thus, for example, the prior art products generally employ sugars as water binders together with antimycotics such as sorbic acids and its salts. The disclosure of Burgess et al, U.S. Pat. No. 3,202,514, is incorporated by reference in this regard.

The product which is treated by the process of the present invention preferably comprises a moisture-containing matrix of proteinaceous materials normally capable of supporting bacteriological and/or mycotic growth, having dispersed throughout water binding ingredients sufficient to achieve an $A_w$ of below about 0.93, and further having in contact therewith a sorbic acid or sorbate salt antimicrobial agent. The level of the water binding ingredients and antimicrobial agent is sufficient to keep the product resistant to microbial growth and decomposition when packaged in a carbon dioxide atmosphere according to the present process. The level of antimicrobial agents and $A_w$ lowering ingredients will be balanced to achieve stability at the given moisture content. For example, it may be necessary to employ only a minor amount of antimicrobial agent where the $A_w$ of a given intermediate moisture system is at a level nearly precluding all growth. Conversely, larger amount of antimicrobial agents may be needed in a moisture-containing system wherein the $A_w$ is closer to 0.93. It is possible according to this invention to employ levels of polyhydric alcohol, such as 1,2-propane diol and 1,3-butane diol, below those normally effective to prevent mycotic or bacterial growth in the absence of carbon dioxide.

Useful as water binding ingredients are any of the edible materials, either soluble or insoluble, which have the ability to tie up water to such an extent that it is no longer usable for microbial growth and propagation. Exemplary of this group of materials are the polyhydric alcohols alone or in combination with sugars and/or mixtures of alkali metal or alkaline earth salts.

The polyhydric alcohols useful as preservatives according to the present invention are preferably those having from 3 to 7 carbon atoms. Preferred di-hydric alcohols are 1,2-propane diol and 1,3-butane diol. Glycerine, a trihydric alcohol, is a very effective water binder and may be used alone but is preferably used in combination with a dihydric alcohol. Other useful polyhydric alcohols include tetritols, such as erythritol or the threitols; pentitols, such as ribitol or xylitol; hexatols, such as sorbitol or mannitol; and heptitols, such as perseitol or volemitol.

Sugars useful as water binding agents in the present invention include the reducing and non-reducing water soluble mono- and polysaccharides; e.g. pentoses such as xylose and arabinose; hexoses such as glucose, fructose or galactose; and disaccharides such as lactose, sucrose and dextrose. To be effective as a bacteriostatic agent, the sugar must be water soluble and of such a low molecular weight as to be effective in increasing the osmotic pressure of the aqueous system in which it is dissolved. Preferred sugars for the purposes of this invention are sucrose, dextrose and highly converted corn syrups, especially high fructose corn syrups.

Various alkali metal and alkaline earth metal halide salts are also effective water binding agents, but these salts must be used in combination with sugars or polyhydric alcohols where the moisture level of the protein is above about 15% by weight. This is due to the fact that most salts cannot be used in the protein products of this invention at levels at above about 4% by weight without posing health problems and seriously detracting from product palatability. Preferred among such salts are sodium chloride and calcium chloride The preferred level of salt addition ranges from about 0.5 to about 4.0% by weight.

The amount and choice of preservative employed in the present invention will depend upon the amount of moisture present in the product and the organoleptic effect desired. The polyhydric alcohol may be used as the sole preservative; however, it is desirably employed at a level from about 4 to about 20% in combination with a salt and/or sugar. As indicated above, the salt level will range from about 0.5 to about 4.0% by weight, and it is preferred according to the present invention that the sugar be present at a level within the range of from about 4 to about 35% by weight. And, where it is desired to maintain relatively low levels of salts and sugars, polyhydric alcohols can be employed at levels of from 6% up to about 35% by weight of the product. As a guide in formulating intermediate moisture products of the kind referred to in the aforementioned Burgess et al patent, U.S. Pat. No. 3,202,514, the total level of preservatives from the group of sugars, polyhydric alcohols and salts, should be about equal to the moisture content of the product; however, the more effective water binders and antimicrobials such as the salts, low molecular weight sugars, and more effective of the polyhydric alcohols, will enable the reduction of this level to about half of the weight of the moisture content of the product.

The term "proteinaceous material" is meant to include proteinaceous meaty materials and non-meat protein materials. For purposes of palatability, it is preferred that the products treated by the process of this invention contain proteinaceous meaty material. The term proteinaceous meaty material refers to the group consisting of meat, meat by-products and meat meal, as well as mixtures of these. The term meat is understood to apply not only to the flesh of cattle, swine, sheep and goats, but also horses, whales and other mammals, poultry and fish. The term meat by-products is intended to refer to those non-rendered parts of the carcass of slaughtered animals including but not restricted to mammals, poultry and the like and including such ingredients as are embraced by the term "meat by-products" as defined in the 1975 official publication of the Association of American Feed Control Officials, Incorporated. Likewise, the term meat meal refers to the finely ground, dry rendered residue from animal tissues, including those dried residues embraced by the term "meat meal" as defined by the aforesaid association. Indeed, the terms meat, meat by-products, and meat meal are understood to apply to all of those animal, poultry and marine products defined by said association. In all cases where meat is employed, it is preferred that it be heated for times and at temperatures effective to pasteurize it. In the case of dry meat meals, the drying temperatures normally employed during its production are effective for this purpose.

The proteinacious meaty material will preferably constitute a significant portion of the products, typically greter than about 10% by weight and preferably greater than 30%. A typical range for such ingredient is from about 20 to about 50% by weight, but can be as high as about 80%.

Apart from the proteinaceous meaty material and the preservation system, the products contemplated for treatment according to the process of this invention may optionally, though preferably, contain other proteinacious ingredients, texturizers, vitamins, minerals, colorings, flavorings, and the like. Fat or oil may be desirably added, preferably in the source ingredients although it may be sprayed or otherwise coated onto the final product.

Non-meat proteinaceous materials, i.e., protein sources other than the proteinaceous meaty material, are preferably employed to achieve a fully balanced, nutritional feed ration. And, where desired, they can be employed as the sole protein source. Typically, the protein will be derived from a vegtable protein source such as soy bean, cotton seed, peanuts and the like. The protein may be present in the form of meal, flour, concentrate, isolate or the like. A preferred protein source is soy. Texturized protein materials simulating natural meat can also be employed. Additional protein may be derived from milk products, such as dried buttermilk, dried skimmed milk, whey, casein, and other like protein sources, such as eggs or cheese.

While these additional protein sources are generally mixed with the starting ingredients, all or part of some of these protein materials may be used to coat the otherwise formed final product.

Texturizing agents may be added at minor weight percents if desired, although it is found that the utilization of the polyhydric alcohols such as 1,2-propane diol, 1,3-butane diol, glycerol, etc., employed as preservatives, will generally be sufficient to impart the necessary plasticity and texture to the final product.

The food composition can also contain a binder material in an amount effective to keep the formed composition coherent and shape-retaining after cooking. The binder material may be of the proteinaceous or farinaceous variety such as egg albumen, wheat flour, corn flour and the like, or may be a polymeric carbohydrate binder such as sodium carboxy methyl cellulose, gelatin, alpha cellulose, and the like. The binder is preferably employed in higher moisture products (e.g., above about 30% water) at from about 3 to 10% by weight and most preferably from about 5 to about 8% by weight of the total product.

The above ingredients are then processed according to the techniques known to the art. These procedures involve pasteurizing the meat alone or with the other ingredients, shaping the product and packaging. Typical of the known procedures is that described in U.S. Pat. No. 3,202,514. The pasteurization, necessary when meats are employed, not only reduces the bacterial content of the material, but also eliminates natural enzyme activity present either in the meaty or other ingredients.

The product improvement provided for by the present invention calls for sealing the package having substantially all void spaces therein filled with carbon dioxide. If desired, the product can be degassed and/or flushed with carbon dioxide prior to packaging. To be effective over reasonable periods of storage, the packaging material must be substantially impervious to gases such as water vapor, carbon dioxide and oxygen. Typical of suitable packaging materials are polyethylene-coated aluminum foil and polyvinylidene chloride-coated polyethylene. Other suitable materials are also known to those skilled in the art, as is the equipment capable of feeding the food into such packages, flushing the package with carbon dioxide as by a probe within the package during filling, and sealing the packages such as by heat sealing.

The following Examples are presented for the purpose of further explaining and illustrating the present invention and are not to be taken as limiting in any regard. Unless otherwise indicated, all parts and percentages are by weight.

EXAMPLE I

An intermediate moisture dog food was prepared from the following formulation:

| INGREDIENT | PARTS |
| --- | --- |
| Partially defatted beef fatty tissue (rendered at 180° C) | 38.9 |
| Whole Ground Chicken (Rock) | 19.0 |
| Glycerine | 9.0 |
| 1,2-propane diol | 8.0 |
| Bleachable Fancy Tallow | 5.0 |
| Corn Flour | 7.7 |
| Dextrose | 4.0 |
| Soy Protein Concentrate | 3.0 |
| Iodized salt | 1.3 |
| Tricalcium Phosphate | 1.7 |
| Soy Protein Isolate | 1.5 |
| Vitamin premix | 0.16 |
| Iron Oxide | 0.06 |
| Potassium Chloride | 0.25 |
| Antioxidant | 0.005 |

To prepare the dog food, the partially defatted beef fatty tissue and whole ground chicken were ground in a Hobart meat grinder fitted with inch dies, and mixed in a dry blender with the remainder of the ingredients with the exception of the soy protein isolate. After a uniform blend was achieved, the mix was then extruded into chunks, coated with the soy protein isolate and heated with steam at 280° F for 10 minutes. The resulting cohesive chunks were then cooled, sealed in polymer film bags, and placed in 0° F storage for at least 24 hours. The samples remained frozen until use, at which time they were thawed.

The dog food thus prepared, which had an $A_w$ of 0.90, was inoculated with a Staphylococus Inoculum containing $1 \times 10^5$ organisms/gram, plated on nutrient agar, and exposed to separate atmospheres of $CO_2$ and air with the following results:

| Time | Count (Organisms/gram) | |
| --- | --- | --- |
| (Days) | Air | $CO_2$ |
| 15 | $2 \times 10^5$ | $2 \times 10^3$ |
| 23 | $3 \times 10^6$ | $2 \times 10^2$ |
| 31 | $3 \times 10^6$ | $<10^2$ |

EXAMPLE II

The above procedure for preparing and testing the dog foods was repeated, but this time employing an inoculum of $4 \times 10^5$ organisms per gram. The samples showed $A_w$ values indicated:

| Time (Days) | Count (Organisms/gram) | | |
|---|---|---|---|
| | $A_w = 0.91$ Air | $A_w = 0.91$ $CO_2$ | $A_w = 0.93$ $CO_2$ |
| 8 | $2 \times 10^8$ | $2 \times 10^5$ | $2 \times 10^5$ |
| 20 | Spoiled | $2 \times 10^4$ | $2 \times 10^4$ |
| 35 | Spoiled | $2 \times 10^3$ | $8 \times 10^2$ |

The foregoing description is presented for the purpose of enabling those skilled in the art to understand and practice the present invention, and does not attempt to describe all modifications and variations thereof which will become apparent to those skilled in the art upon reading it. However, all such modifications and variations are meant to be included within the scope of the present invention which is defined by the following claims.

What is claimed is:

1. In a method for preparing an intermediate-moisture food comprising pasteurized meat and containing a polyhydric alcohol for antimicrobial purposes, the improvement comprising:
   packaging said food in a substantially gas impervious packaging material, and filling the free space in the package with carbon dioxide,
   said food containing a level of said polyhydric alcohol which is ineffective in the absence of the carbon dioxide to prevent microbial growth, but effective to prevent microbial growth when the food is packaged in carbon dioxide.

2. A method according to claim 1 wherein the polyhydric alcohol is selected from the group consisting of 1,2 propane diol and 1,3-butane diol.

3. A method according to claim 2 wherein the intermediate-moisture food is a pet food and has a moisture content of from about 15 to about 50% by weight of the total composition, an $A_w$ of from about 0.5 to about 0.93 and a pH of from about 3.5 to about 8.0.

4. A method according to claim 3 wherein the pet food is a full-feeding, nutritionally balanced dog food containing meat and vegetable protein.

5. A packaged pet food prepared according to the method of claim 4.

6. In a method for preparing an intermediate-moisture proteinaceous food comprising non-meat proteinaceous materials as the sole protein source and containing a polyhydric alcohol as an antimicrobial agent, the improvement comprising:
   packaging said food in a substantially gas impervious material and filling the free space in the package with carbon dioxide,
   said food containing a level of said polyhydric alcohol which is ineffective in the absence of the carbon dioxide to prevent microbial growth, but effective to prevent microbial growth when the food is packaged in carbon dioxide.

7. A method according to claim 6 wherein the polyhydric alcohol is selected from the group consisting of 1,2 propane diol and 1,3-butane diol.

8. A method according to claim 7 wherein the intermediate-moisture food is a pet food and has a moisture content of from about 15 to about 50% by weight of the total composition, an $A_w$ of from about 0.5 to about 0.93 and a pH of from about 3.5 to about 8.0.

9. A method according to claim 8 wherein the pet food is a full-feeding, nutritionally balanced dog food containing vegetable protein.

10. A packaged pet food prepared according to the method of claim 9.

* * * * *

UNITED STATES PATENT AND TRADEMARK OFFICE
CERTIFICATE OF CORRECTION

PATENT NO. : 4,049,835
DATED : Sept. 20, 1977
INVENTOR(S) : Gerhard Julius Haas et al It is certified that error appears in the above-identified patent and that said Letters Patent are hereby corrected as shown below:

Column 6, line 40, after "with" and before "inch" insert --3/8--.

Signed and Sealed this

Seventh Day of February 1978

[SEAL]

Attest:

RUTH C. MASON
Attesting Officer

LUTRELLE F. PARKER
Acting Commissioner of Patents and Trademarks